United States Patent [19]

Kulp

[11] Patent Number: 4,557,367

[45] Date of Patent: Dec. 10, 1985

[54] HELICAL CONVEYOR

[75] Inventor: Jonathan P. Kulp, York, Pa.

[73] Assignee: Harsco Corporation, Wormleysburg, Pa.

[21] Appl. No.: 350,802

[22] Filed: Feb. 23, 1982

[51] Int. Cl.[4] .................................................. B65G 15/26
[52] U.S. Cl. .................................... 198/313; 198/780; 198/624; 414/431
[58] Field of Search ....................... 89/33 BB, 40 F; 414/431, 432, 910; 198/313, 780, 624, 316, 563, 812; 193/35 TE

[56] References Cited

U.S. PATENT DOCUMENTS

| | | | |
|---|---|---|---|
| 785,569 | 3/1905 | Plunket | 198/313 |
| 1,877,975 | 9/1932 | Robb | 414/910 |
| 2,048,948 | 7/1936 | Postlewaite | 414/432 |
| 2,198,178 | 4/1940 | Postlewaite | 414/431 |
| 2,307,614 | 1/1943 | Becker . | |
| 2,540,994 | 2/1951 | Rogers | 414/432 |
| 2,576,217 | 11/1951 | Eggleston | 198/313 |
| 2,608,224 | 8/1952 | Eklund et al. | 414/432 |
| 2,626,717 | 1/1953 | Kraner | 414/432 |
| 2,678,125 | 5/1954 | Bonney | 198/812 |
| 2,793,736 | 5/1957 | Thomson | 194/35 TE |
| 2,795,320 | 6/1957 | Dillingham | 414/432 |
| 2,863,553 | 12/1958 | Nordquist | 198/563 |
| 2,971,631 | 2/1961 | Gray | 198/316 |
| 3,038,587 | 6/1962 | Bilocq | 414/431 |
| 3,098,570 | 7/1963 | Lindemann . | |
| 3,191,762 | 6/1965 | Brietzke . | |
| 3,294,216 | 12/1966 | Girardi | 198/812 |
| 3,329,096 | 7/1967 | McGovern . | |
| 3,331,488 | 7/1967 | Wellman . | |
| 3,447,074 | 5/1969 | Sower et al. | 414/431 |
| 3,507,412 | 4/1970 | Carter . | |
| 3,596,785 | 8/1971 | Weatherford | 198/313 |
| 3,743,124 | 7/1973 | Jarvis | 414/431 |
| 3,797,686 | 3/1974 | Jarvis | 414/431 |
| 3,854,614 | 12/1974 | Albrecht | 414/432 |
| 3,876,060 | 4/1975 | Stease | 193/35 TE |
| 4,004,490 | 1/1977 | Dix et al. . | |
| 4,067,450 | 1/1978 | Birdwell . | |
| 4,166,408 | 9/1979 | Wetzel et al. . | |
| 4,236,441 | 12/1980 | Turner et al. . | |
| 4,260,053 | 4/1981 | Onodera | 198/812 |

FOREIGN PATENT DOCUMENTS

| | | | |
|---|---|---|---|
| 566323 | 12/1932 | Fed. Rep. of Germany | 198/780 |
| 1553515 | 1/1969 | France | 198/624 |
| 603774 | 4/1948 | United Kingdom | 89/33.2 |
| 516595 | 9/1976 | U.S.S.R. | 198/780 |

Primary Examiner—Trygve M. Blix
Assistant Examiner—Stephen P. Avila
Attorney, Agent, or Firm—Kerkam, Stowell, Kondracki & Clarke

[57] ABSTRACT

A helical conveyor is especially adapted to convey cylindrical articles such as projectiles quickly between two points. The helical conveyor may include an internal helical skeleton about which a helical casing rotates. Alternately, the helical conveyor may be realized by an external helical skeleton supporting a large number of cylindrical rollers which are disposed in a flighted configuration to approximate a helix. The skeleton is a spring-like structure which allows great flexibility in operating the conveyor to transport loads. A motor is used for driving the conveyor to transport articles. The conveyor may be mounted to a vehicle such as an ammunition supply vehicle to provide for the rapid supply of projectiles to a tank, self-propelled howitzer, or similar weapon.

17 Claims, 9 Drawing Figures

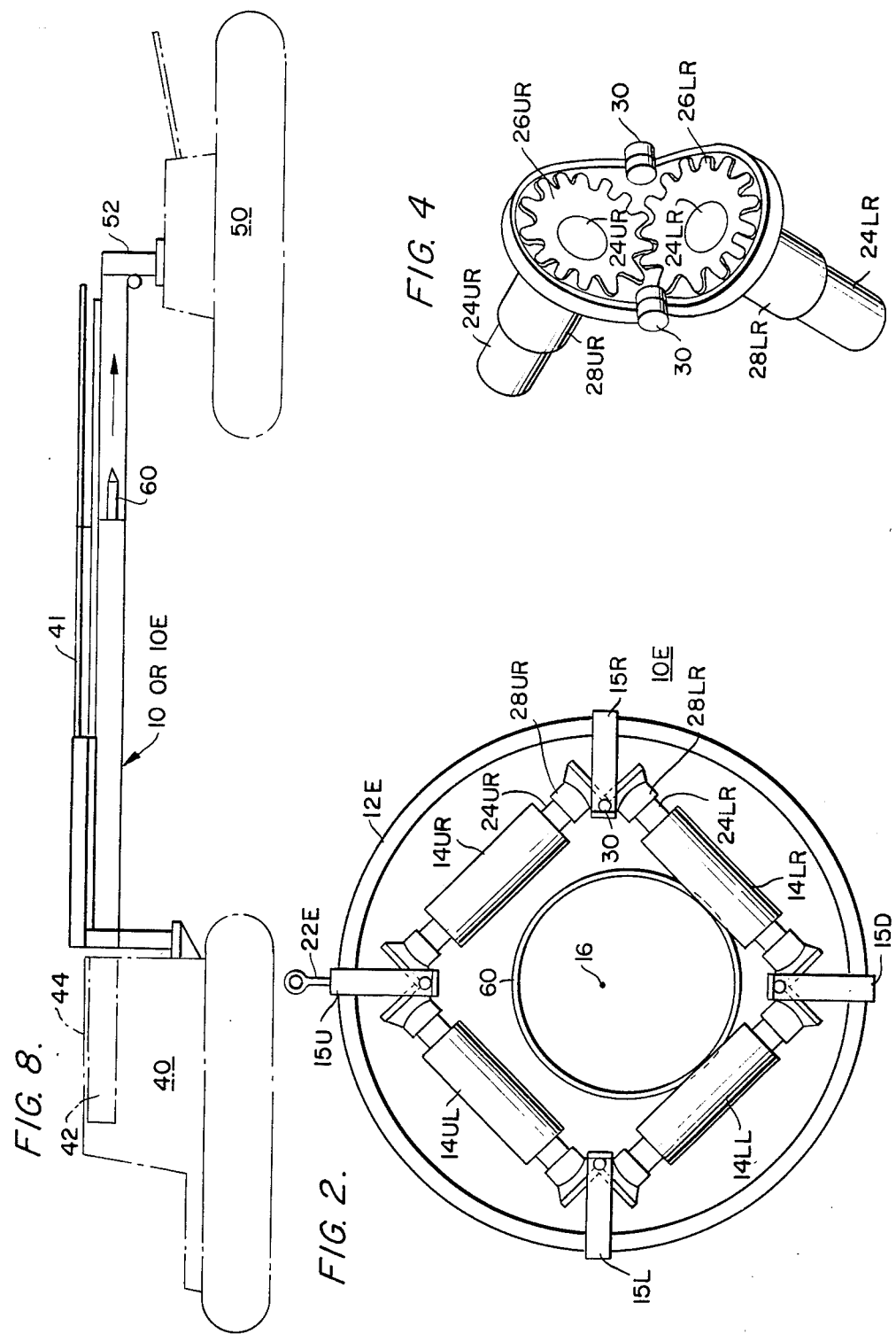

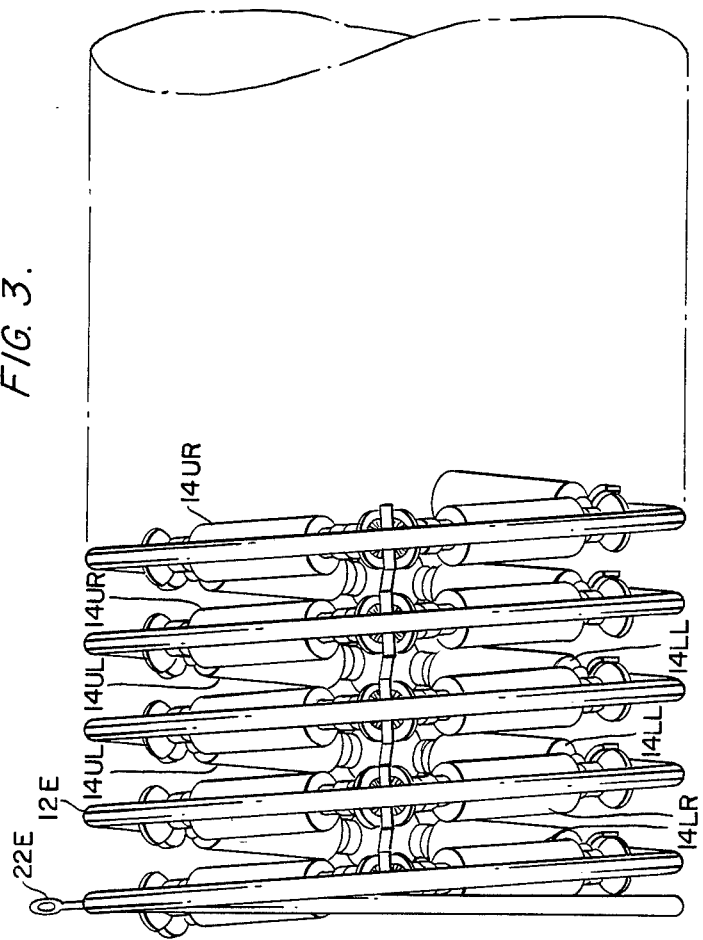

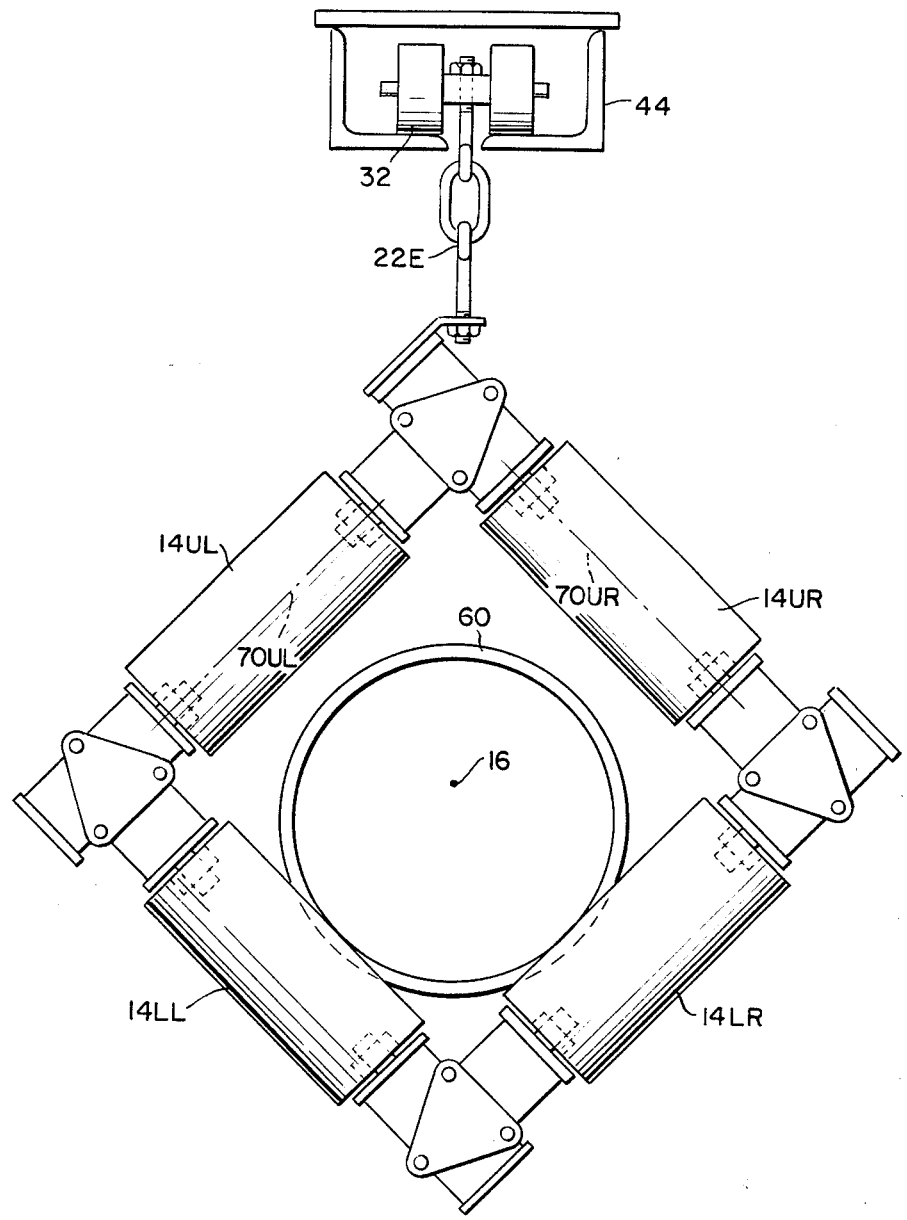

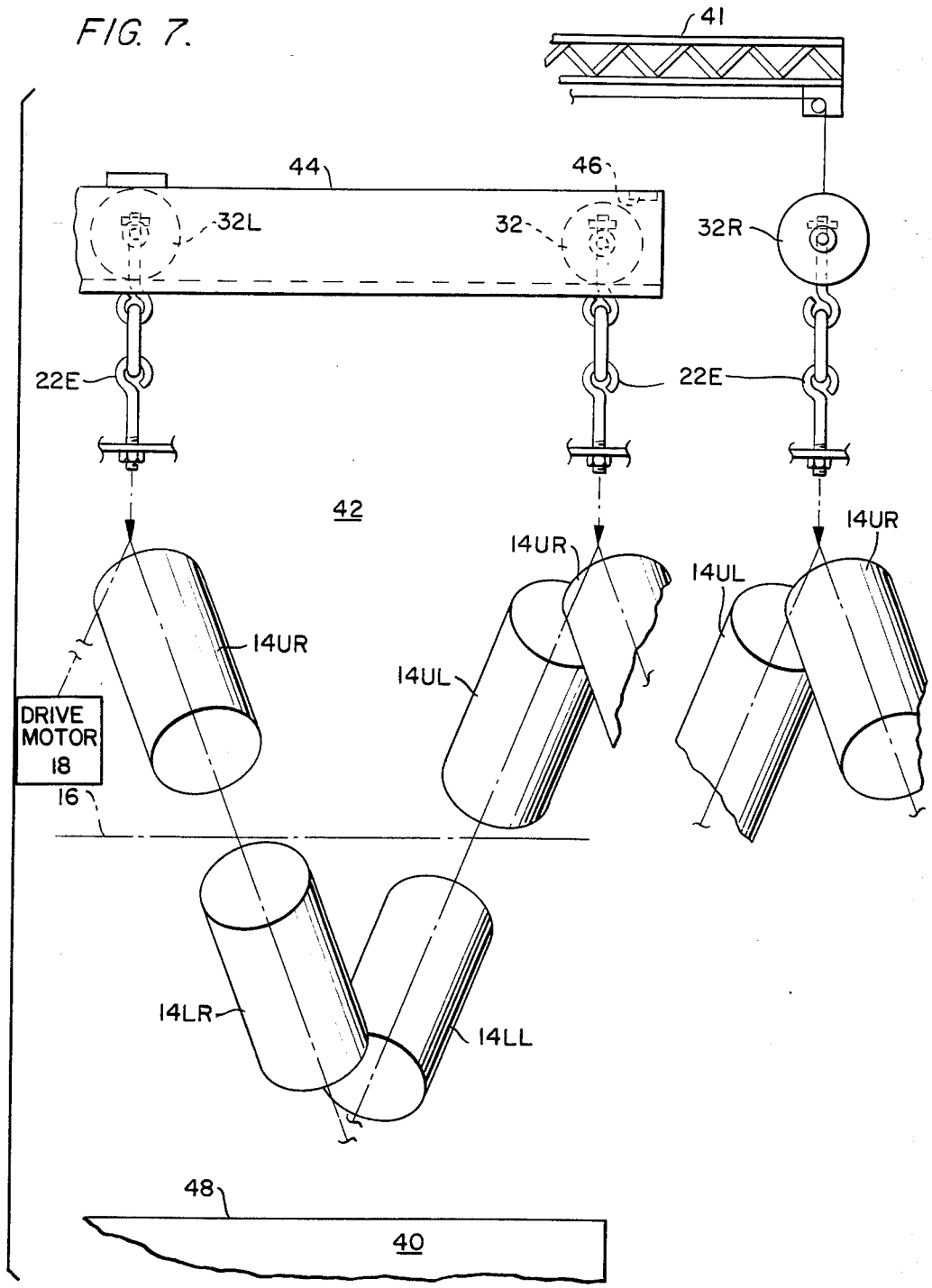

HELICAL CONVEYOR

BACKGROUND OF THE INVENTION

This invention relates to a conveyor. More particularly, this invention relates to a helical conveyor especially useful for the conveyance of projectiles.

A conveyor for transporting projectiles is disclosed in U.S. Pat. No. 4,236,441, invented by John Turner et al., patented Dec. 2, 1980, assigned to the assignee of the present invention, and hereby incorporated by reference.

Although the prior art includes numerous constructions for conveyors, prior art conveyors have generally been subject to one or more of several significant disadvantages. In particular, such conveyors are often limited to a single starting point and a single ending point. For example, a conventional conveyor belt will receive articles to be conveyed at one end and convey the articles to another end. Changing the starting point or the ending point of the conveyor belt usually requires major redesign.

Although some conveyors are sufficiently adaptable to readily allow change in the starting point of conveyance and the ending point, such conveyors are generally ill suited towards the rapid conveyance of a large number of articles from one point to another point. For example, a conventional crane as often used in construction projects allows the conveyance of articles between any two points within the range of the crane. However, the crane must repeatedly traverse the distance between the starting point of conveyance and the ending point of conveyance. This step requires operator control and is time consuming.

Yet another disadvantage common to the prior art is that conveyors are often rigid in configuration. That is, even those conveyors which are not absolutely fixed to a particular starting point and ending point, may still require that the starting point and the ending point be a particular distance apart. In addition to requiring a particular distance between the starting point and the ending point, prior art conveyors are often limited to a particular geometrical configuration between the starting point and the ending point. That is, the conveyor is usually fixed in a straight line or a particular predetermined curve. In either case, the conveyor is greatly limited in operation because of this.

Prior art conveyors are further disadvantageous in that they often do not adequately secure the conveyed article to the conveyor itself. A jolting or other disturbance may therefore cause the conveyed articles to fall off the conveyor as, for example, a conventional conveyor belt. At the other extreme, those prior art conveyors which require the conveyed articles to be positively attached to the conveyor itself may slow down the conveyance operation by requiring time consuming attaching and unattaching steps. For example, a conventional crane often attaches to the eyelet of a load or article to be conveyed. The article must be attached to the crane at the starting point and unattached from the crane at the ending point.

Prior art conveyors often require large driving structures which greatly hinder the portability and/or adaptability of the conveyor for various uses. That is, even in the case of a conveyor which is somewhat portable, the use of a large and cumbersome driving structure may make it cumbersome to move the conveyor.

OBJECTS

Accordingly, it is a general object of the present invention to provide a new and improved conveyor.

A more specific object of the present invention is to provide a helical conveyor which is specially adapted for transportation of projectiles from an ammunition supply vehicle to a tank, self-propelled howitzer, or other artillery piece.

A further object of the present invention is to provide a conveyor which is expandable in length and sufficiently flexible to allow it to be curved in operation.

A further object of the present invention is to provide a conveyor which is highly reliable in preventing conveyed objects from being improperly conveyed as by falling off the conveyor or similar malfunctions.

A still further object of the present invention is to provide a conveyor which is highly adaptable in allowing itself to be connected between an arbitrary starting point and an arbitrary ending point.

Yet another object of the present invention is to provide a conveyor which may rapidly convey a large number of articles without requiring a lengthy set up time.

Yet another object of the present invention is to provide a conveyor which does not have a large driving structures which interfere with the portability and adaptability of the conveyor.

SUMMARY OF THE INVENTION

These and other objects of the present invention which will become apparent as the description proceeds are realized by an apparatus including a conveyor having an extended length along a conveyor axis and a retracted length shorter than the extended length. The conveyor comprises driving surfaces at a plurality of locations along the conveyor axis, the driving surfaces including non-horizontal right lower and left lower driving surfaces, support structure supporting the driving surfaces, and a motor for driving the driving surfaces by rotating the driving surfaces about a plurality of rotation axes which are askew to the conveyor axis. Rotation of the driving surfaces is used to move articles supported by the right and left lower driving surfaces in a direction along the conveyor axis. Preferably, the support structure comprises an extendable helical skeleton supporting the driving surfaces. The helical skeleton may be either an external skeleton which surrounds (i.e., encircles) the driving surfaces or a non-rotating core disposed inside of a rotating helical casing. The driving surfaces are arranged in a flighted configuration either as number of discrete rollers which approximate a helix or as the outside of a helical rotating casing. An overhead support and overhead support driver are used for expanding and contracting the conveyor. The conveyor is specifically adapted to transport projectiles and is mounted to a vehicle.

BRIEF DESCRIPTION OF THE DRAWINGS

The above and further objects of the present invention will be more readily apparent when viewed in conjunction with the accompanying drawings wherein like characters represent like parts throughout and in which:

FIG. 2 shows an end view of an external skeleton embodiment of the present invention.

FIG. 3 shows a side view of an external skeleton embodiment of the present invention.

FIG. 4 shows a detailed perspective of a part of the external skeleton embodiment of the present invention.

FIG. 5 shows an end view of a part of the external skeleton embodiment of the present invention.

FIG. 7 shows a simplified side view of the external skeleton embodiment of the present invention with the conveyor in an expanded condition.

FIG 8 shows in schematic side view the present invention in use.

DETAILED DESCRIPTION OF THE INVENTION

Figure 1:
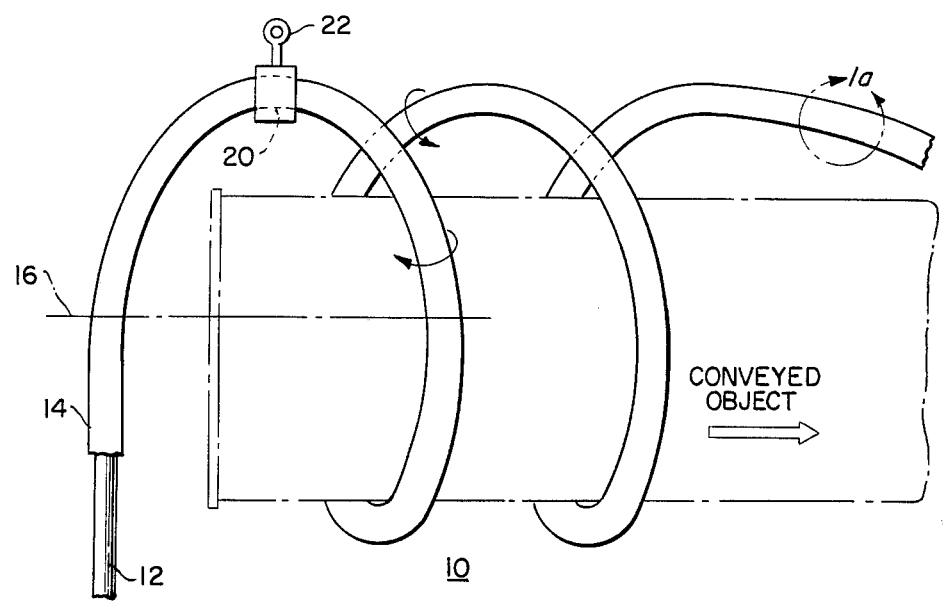
FIG. 1 shows a perspective view of an internal skeleton embodiment of the present invention with an object being conveyed thereby.
Figure 1A:
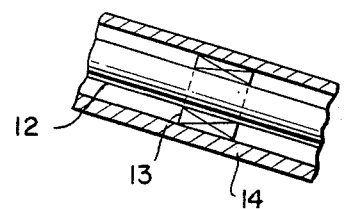
FIG. 1a shows in detail the area labeled 1a of FIG. 1.

Turning now to FIG. 1 and FIG. 1a, the internal skeleton embodiment of the present invention will be discussed. FIG. 1 shows a perspective view of the internal skeleton embodiment of the present invention, whereas FIG. 1a shows a detailed view in partial cross-section at location 1a of FIG. 1.

The internal skeleton embodiment of the present conveyor 10 includes a non-rotating, spring-like core 12 in the form of a helix as shown. The core 12 acts as an internal skeleton or support structure which supports driving surfaces on a flexible rotating casing 14.

The flexible rotating casing 14 is a helix which is internally supported by the helical core 12. Bearings 13 (FIG. 1a only), which may be beads of Teflon, graphite Teflon or rollers, allow the rotating casing 14 to rotate relative to the nonrotating core 12.

A drive motor 18, which may be an electric, hydraulic, internal combustion, or other type of motor, causes the casing 14 to rotate relative to the core 12. The rotation of the driving surfaces on the outside of helical casing 14 causes a cylindrical object to be conveyed along a conveyor axis 16 as shown. The conveyed object could for example be a projectile or similarly shaped object.

Conveyor 10 further includes a plurality of overhead support sleeves 20 having an eyelet 22 attached thereto. The support sleeve 20 would hold up the rotating casing 14 without interfering with its rotation. If desired, helical casing 14 may include slightly wider portions (not shown) on both sides of sleeve 20 which would maintain the overhead support sleeve 20 against sliding along the length of casing 14. Although only one sleeve 20 is shown in the drawing, it will be appreciated that in actual practice several sleeves may be disposed at various points along the length of conveyor axis 16. The eyelet 22 may be used for connecting the sleeve to a curtain rod suspension type of system (not shown in FIG. 1) or for connecting the remote end (opposite drive motor 18) to a crane (not shown in FIG. 1) whereby the remote end may be positioned at an arbitrary ending point.

Since the conveyor 10 is basically a helical spring including a spring-like flexible skeleton 12, it is capable of extension and retraction and of bending in multiple planes simultaneously. The limits of extension and retraction are the diametral changes which accompany extension and retraction, and the limit of bending would depend on the length of the conveyed object. It should be noted that the flexibility of construction is the key to its function and that stretching the conveyor axially until its mean inside diameter was smaller than the conveyed object would not necessarily preclude operation. In such a case the conveyor would contract in the vicinity of the object due to the torque resultant in the casing and core, and would then be able to expand its diameter to accomodate the object. This may be understood as being quite similar to a snake swallowing an egg much larger in diameter than itself.

Various materials may be used for the internal helical skeleton 12 and the helical rotating casing 14. Preferably the internal helical skeleton core 12 will be a steel spring structure which is quite durable but is also flexible. The helical rotating casing 14 poses a materials trade-off between resilient materials which may require too much wind up (i.e., time lag between movement at one end and the transmission of the movement to the far end) and rigid materials which may fatigue too easily. The helical rotating casing 14 may be made of layers of rubber with steel mesh in between adjacent layers. However, because of the large amount of internal friction generated in the present use, fiber reinforced plastic may yield a longer fatigue life. It should further be noted that in place of bearings 13 a fluid (liquid or gas) could be used for bearing purposes in between the core 12 and the casing 14.

Figure 6:
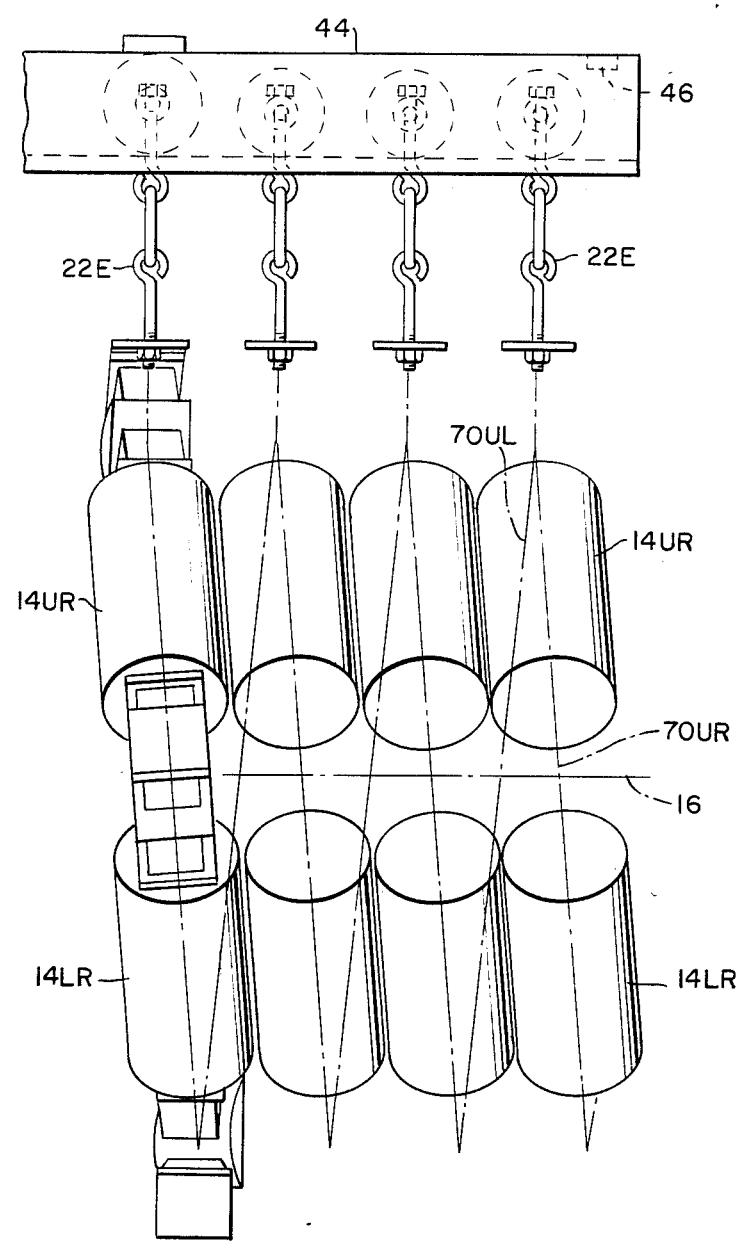
FIG. 6 shows a side view of a part of the external skeleton embodiment of the present invention.

Turning now to FIGS. 2–7, an external skeleton embodiment of the present invention will be discussed. FIG. 2 shows an end view of an external skeleton embodiment of the present invention, whereas FIG. 3 shows a side view of the same structure shown in FIG. 2. FIG. 4 shows a detail perspective of a part of the structure of FIG. 2 and 3. FIG. 5 shows a slightly modified embodiment in end view of a conveyor according to the present invention, whereas FIG. 6 shows a side view in retracted position and FIG. 7 shows a side view in extended position of this embodiment.

Considering first especially FIGS. 2, 3 and 4, the external skeleton embodiment of the present conveyor 10E will be discussed. The external skeleton conveyor 10E includes a helical external skeleton 12E. The external skeleton 12E along with upper, lower, right and left supports respectively labeled 15U, 15D, 15R and 15L serve as a support structure for a plurality of rollers. In particular, the rollers include upper right, lower right, lower left and upper left rollers respectively labeled 14UR, 14LR, 14LL and 14UL.

Each roller is drivingly connected to the adjacent roller at each of its ends as shown in detail in FIG. 4. In particular, each roller such as 14LR includes a shaft such as 24LR at each end which rotates with the roller. The shaft 24LR extends to within a coupling sleeve 28LR which also houses gear 26LR for rotation with the roller 14LR. The rotation of the gear 26LR will cause engaged gear 26UR to rotate, thereby causing the rotation of roller 14UR by way of shaft 24UR. The coupling sleeve 28LR is hinged at pivot axis 30 relative to coupling sleeve 28UR. For simplicity's sake, the support 15R is not shown in FIG. 4. Although only the details of the intersection between roller 14UR and 14LR is shown in FIG. 4, it will be appreciated that the interface between any two rollers will be likewise constructed, thereby allowing the transmission from an initial roller to the other three rollers in a particular flight, and onto the next flight in similar fashion. The initial roller, although not shown in the drawings, may simply include a shaft such as 24 which is driven by the motor adjacent a starting point of conveyance.

The basic operation of the embodiment shown in FIGS. 2–4 will be quite similar to that of FIG. 1. However, in this embodiment, the driving surfaces include a number of flights of rollers, each flight including four rollers, which are used to approximate the helical configuration. The gears 26 are used to transmit power from one roller to an adjacent roller such that a tank shell (FIG. 2) or similar cylindrical object may be conveyed along the conveyor axis 16. An eyelet 22E may be attached to the external skeleton 12E to provide an overhead support for attachment to an overhead support driver (not shown in FIGS. 2–4) or for a curtain rod type suspension as will be discussed below.

By using hinges to allow adjacent rollers to pivot about axis 30 relative to each other, the angle between adjacent rollers may be adjusted to effectively change the diameter of the conveyor, thereby accommodating different sized loads. The rollers may be hollow or solid 60A durometer rubber which will flex sufficiently to allow the conveyor 10E to extend to an extended length significantly longer than its contracted length. The mechanism for extending the length will be discussed in detail below.

Turning now to FIG. 5, FIG. 6 and FIG. 7, the details of an overhead support system for the present invention will be discussed. FIG. 5 shows an end view of the external skeleton embodiment of the present invention with the external skeleton not shown. Additionally, the FIG. 5 end view is of a modified embodiment from that shown in FIGS. 2–4 in that the rollers 14UL, 14LL, 14UR and 14LR are connected by a Boston gear angle drive model RA 621 instead of the gearing shown in FIG. 1. The rollers 14, which may be urethane function in exactly the same manner as those shown in FIGS. 2–4. FIGS. 6 and 7 show schematic side views of the conveyor of the present invention respectively in a contracted length and an extended length.

As shown in FIG. 5, the eyelet 22E is connected to a number of urethane wheels 32 which are disposed in an overhead track assembly. As shown in FIG. 6, each flight of rollers may include a corresponding set of wheels 32 which are movable along the length of track assembly 44.

In the retracted position shown in FIG. 6, the wheels 32 are relatively close to each other. However, when a crane 41 which is attached to vehicle, 40 (FIG. 7 only) is used to pull a remote set of wheels 32R away from the vehicle 40 which is used for housing the conveyor 10E the distance between adjacent wheels 32 will greatly increase. The crane 41 is shown schematically, it being readily appreciated that the crane may be configured in a number of possible designs. The important thing is that the crane 41 serves as an overhead support driver to stretch out the conveyor to a fully extended length. The length shown in FIG. 7 is not quite fully extended. At the fully extended length, a wheel 32L which is slightly larger than the other wheels 32 will hit into the stop 46 to prevent the conveyor from being completely pulled out of the track 44. A base 48 is disposed below the storage zone 42, which accommodates the conveyor 10E when it is in its fully retracted position with wheel 32R disposed right at the end of track assembly 44.

For simplicity's sake the external skeleton 12E is not shown in FIGS. 5–7. However, the external skeleton 12E would preferably extend substantially along the length of the conveyor 10E in the manner shown in FIGS. 2 and 3. Alternately, the external skeleton would surround the driving surface rollers 14 only for that portion of the conveyor 10E which would be external to the storage zone 42 when the conveyor 10E is in its extended length.

OPERATION

Turning now to FIG. 8, but also considering all of the foregoing drawings, the operation of the present invention will be discussed. FIG. 8 shows in highly schematic form an ammunition supply vehicle 40 which may be used to convey projectiles 60 to a tank 50. The ammunition supply vehicle, which may for example be a modified version of the vehicle in the incorporated by reference U.S. Pat. No. 4,236,441, includes a storage zone 42 for stowing the present helical conveyor when it is disposed in its retracted position. The storage zone 42 is disposed between track assembly 44 and base 48. A crane 41 is mounted to the supply vehicle 40 for extending and retracting the conveyor 10 or 10E according to the present invention.

Upon positioning the supply vehicle 40 such that the distance to the tank 50 is no greater than the extended length of the conveyor 10 or 10E, the crane 41 may be actuated to extend the conveyor 10 or 10E over to the tank 50. It will be readily appreciated that the internal skeleton embodiment of FIG. 1 could use a number of overhead support sleeves 20 and corresponding eyelets 22 to connect to the track assembly 44. Additionally, the internal skeleton embodiment of FIG. 1 may include an overhead support sleeve 20 at its remote end which could be connected to the crane 41 in a manner substantially similar to that shown in FIG. 7 for the external skeleton embodiment.

Once the conveyor 10 or 10E is extended over to the tank 50 by the crane 41, it may be secured to the tank 50. This could be accomplished in a number of possible ways as, for example, bolting a coupling sleeve or sleeves and/or a support or supports 15R and 15U to a receiving portion 52 of the tank 50. For the internal skeleton embodiment of FIG. 1, the internal non-rotating core skeleton 12 may simply be longer than the rotating casing 14 to allow the bolting of the core 12 to the receiving portion 52 of tank 50.

Note that the drive motor 18 (FIG. 1 only) may be disposed on wheels on the base 48 (FIG. 8) to allow drive motor 18 to freely move within the storage zone 42. A similar arrangement could be used for a drive motor for driving the initial roller 14 for the external skeleton embodiment of FIGS. 2–7, although the motor could alternately be mounted on the external skeleton 12E adjacent an initial roller for driving the roller.

Upon turning on the motor to cause the rotation of the driving surfaces of the helical rotating casing 14 or the driving surfaces of the rollers 14LR, 14UR, 14LL and 14UL, projectiles may be rapidly moved from the supply vehicle 40 to the tank 50. Note that the driving surfaces of the conveyor rotate about a plurality of rotation axes which are askew to the conveyor axis 16. For example, the upper right and upper left rollers 14UR and 14UL respectively define an upper right rotation axis and upper left rotation axis 7OUR and 7OUL (FIGS. 5 and 6 only) which are askew to the conveyor axis 16. Of course, the lower rollers 14LR and 14LL define similar skewed rotation axes. Both embodiment 10 and embodiment 10E will move articles supported by right lower driving surfaces (14LR of 10E and right lower portions of 14 of 10) and left lower driving surfaces (14LL of 10E and left lower portions of 14 of 10).

The great flexibility of the present conveyor 10 or 10E allows one to transport projectiles up, down, or even around corners. This may be quite significant in allowing the ammunition supply vehicle 40 and tank or similar structure 50 to be camouflaged from view or sheltered behind a building, tree or other shelter. Most advantageously, because the present conveyors 10 and 10E include moving or driving surfaces on all sides of the projectile, the projectile may be moved up and down curves without one end of the projectile becoming disengaged from driving surfaces. Further, the fact that the driving surfaces surround the projectile greatly adds to the safety and reliability of the conveyance. For example, if the conveyor 10 or 10E did not surround the projectile 60, a nearby explosion might cause the projectile 60 to bounce out of the conveyor 10 or 10E.

Upon the conveyance of the required number of projectiles to the tank 50 by the conveyor 10 or 10E, the conveyor may be unattached from the receiving portion 52 of tank 50. The crane 41 may then be used to retract the conveyor 10 or 10E to a retracted or stowed position within the storage zone 42 of supply vehicle 40.

Although various details of construction have been included in the present specification, it is to be understood that these details are for illustrative purposes only. Various modifications and adaptations will be readily apparent to those of ordinary skill in the art. Accordingly, the scope of the present invention should be determined by reference to the appended claims.

What is claimed is:

1. An apparatus including a conveyor having a conveyor axis comprising:
   (a) driving surface portions at a plurality of locations along said conveyor axis, said driving surface portions including a plurality of right lower and left lower driving surface portions,
   (b) support structure supporting said driving surface portions, and
   (c) a motor for driving said driving surface portions by rotating said driving surface portions askew to said conveyor axis; and
   wherein rotation of said driving surface portions is operable to move articles supported by said right lower and left lower driving surface portions in a direction along said conveyor axis, and wherein said conveyor has an extended length along said conveyor axis and a retracted length along said conveyor axis shorter than said extended length, said support structure comprises a helical skeleton supporting said driving surface portions and extendable and retractable lengthwise along said conveyor axis to change the length of said conveyor.

2. The apparatus of claim 1 wherein said right lower and left lower driving surface portions are angled relative to the horizon.

3. The apparatus of claim 2 wherein said helical skeleton is an external skeleton which surrounds said driving surface portions.

4. The apparatus of claim 3 wherein said driving surface portions comprise surfaces of a plurality of cylindrical rollers including right lower, left lower, right upper, and left upper rollers.

5. The apparatus of claim 4 wherein said rollers are arranged in a flighted configuration to approximate a helix.

6. The apparatus of claim 5 wherein adjacent pairs of said rollers define corners and at least some of said corners include pivotal connections allowing pivoting of a roller relative to its adjacent roller and further comprising engaged gears for transmitting power from one roller to an adjacent roller.

7. The apparatus of claim 1 wherein said driving surface portions are arranged in a flighted configuration.

8. The apparatus of claim 7 wherein said driving surface portions comprise surfaces of a plurality of cylindrical rollers including right lower, left lower, right upper, and left upper rollers.

9. The apparatus of claim 1, wherein said support structure further includes an overhead support for said driving surfaces and an overhead support driver which is operable to extend and retract said conveyor by moving said overhead support.

10. The apparatus of claim 1, wherein said conveyor is mounted to a vehicle.

11. The apparatus of claim 1, 2, or 7 wherein said conveyor is adapted to transport projectiles.

12. The apparatus of claim 1 wherein said driving surface portions comprise surfaces of a plurality of upper rollers and lower rollers, and further comprising a plurality of pairs of engaged gears for transmitting power between said upper rollers and said lower rollers.

13. The apparatus of claim 12 wherein said helical skeletons is an external skeleton which surrounds said upper and lower rollers.

14. A conveyor apparatus having a longitudinal conveyor axis comprising:
   (a) a helical support member defining the conveyor axis for transport of articles through the helical support member;
   (b) a plurality of driving surface portions disposed at a plurality of locations along said conveyor axis and within said helical support member;
   (c) means for supporting said driving surface portions to said helical member in a position which is askew to said conveyor axis;
   (d) a motor for driving at least one of said driving surface portions;
   (e) means operatively interconnecting other of said driving surface portions for causing rotation of said other driving surface portions when said at least one of said driving portions is driven by said motor such that said conveyor is operable to transport articles supported by said driving surface portions in a direction along said conveyor axis; and
   (f) said helical member being both extendable and retractable along said conveyor axis to change the axial length of said conveyor.

15. The apparatus of claim 14 wherein said driving surface portions comprise cylindrical rollers including right lower, left lower, right upper, and left upper rollers disposed to encircle articles being transported on the conveyor.

16. The apparatus of claim 15 wherein adjacent pairs of said rollers define corners and including pivotal connections at at least some of said defined corners to allow pivoting of a roller relative to its adjacent roller.

17. The apparatus of claim 16 further including gear means connecting adjacent rollers at selected corners for transmitting power from one roller to an adjacent roller.

* * * * *